2,988,078
STARTING SYSTEM FOR INTERNAL COMBUSTION ENGINES USING GASEOUS FUEL
Roy K. Ensign and Roy F. Ensign, Fullerton, Calif., assignors to Ensign Carburetor Company, Fullerton, Calif., a corporation of California
Filed Feb. 4, 1960, Ser. No. 6,696
16 Claims. (Cl. 123—179)

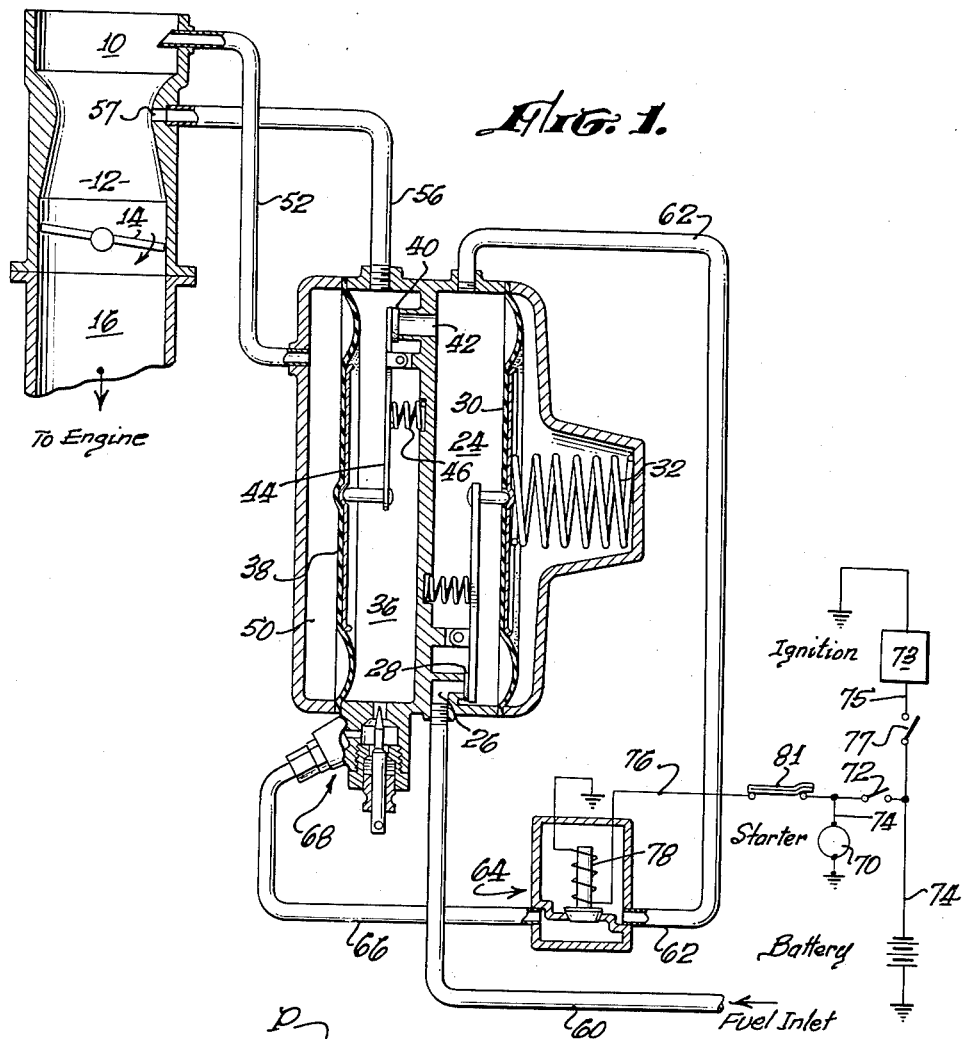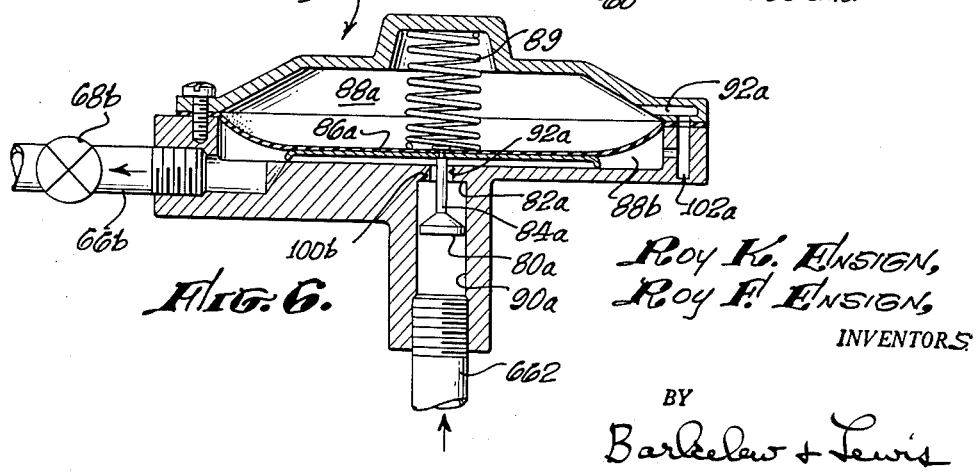

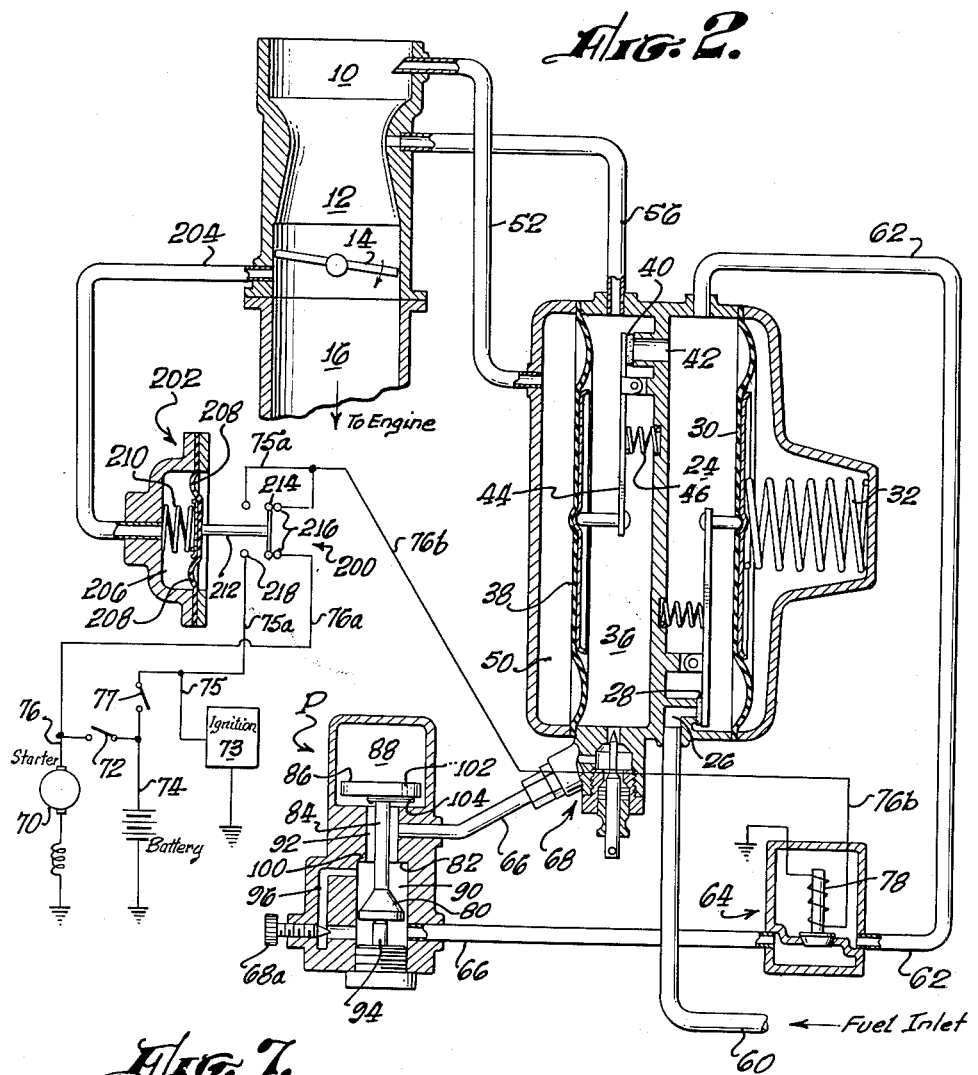

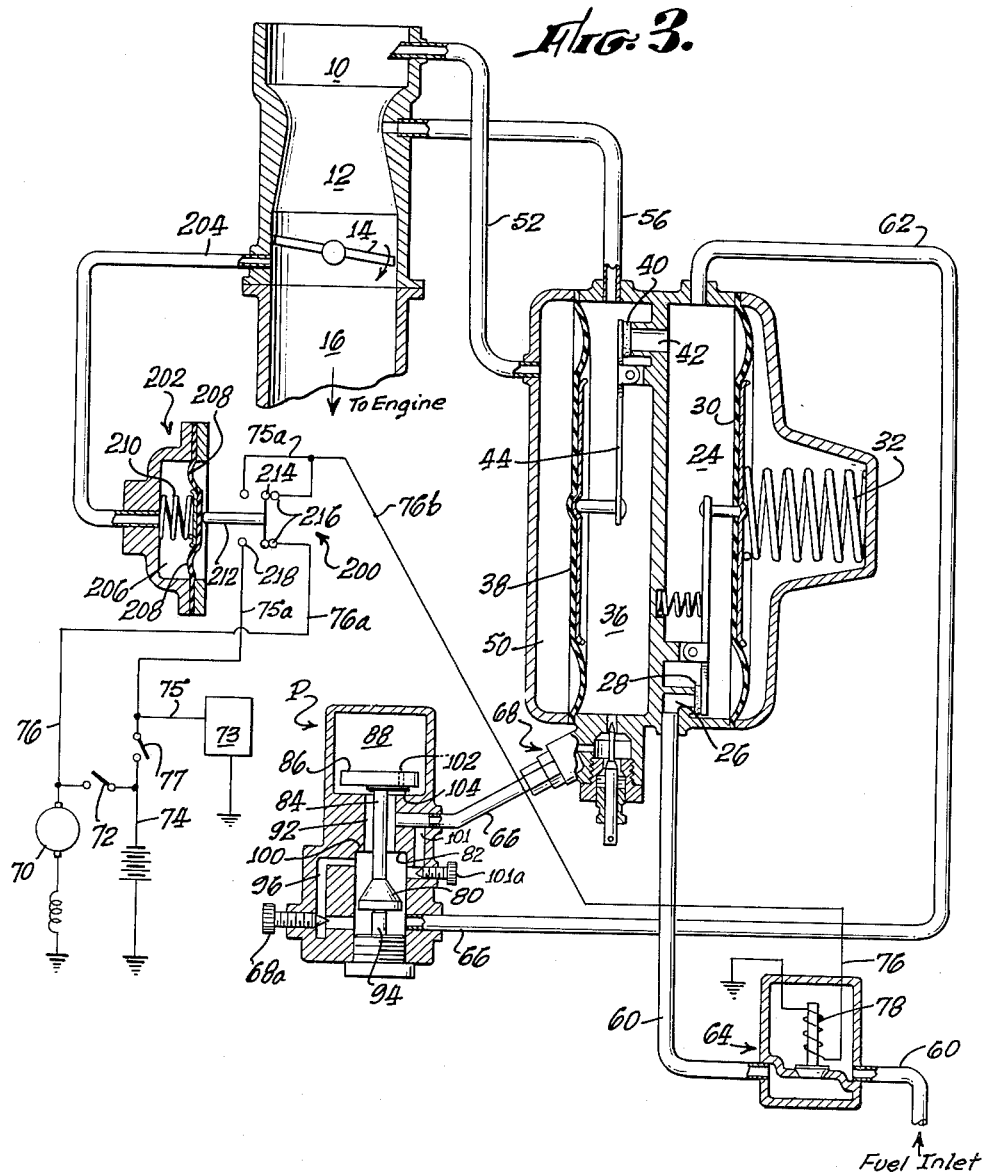

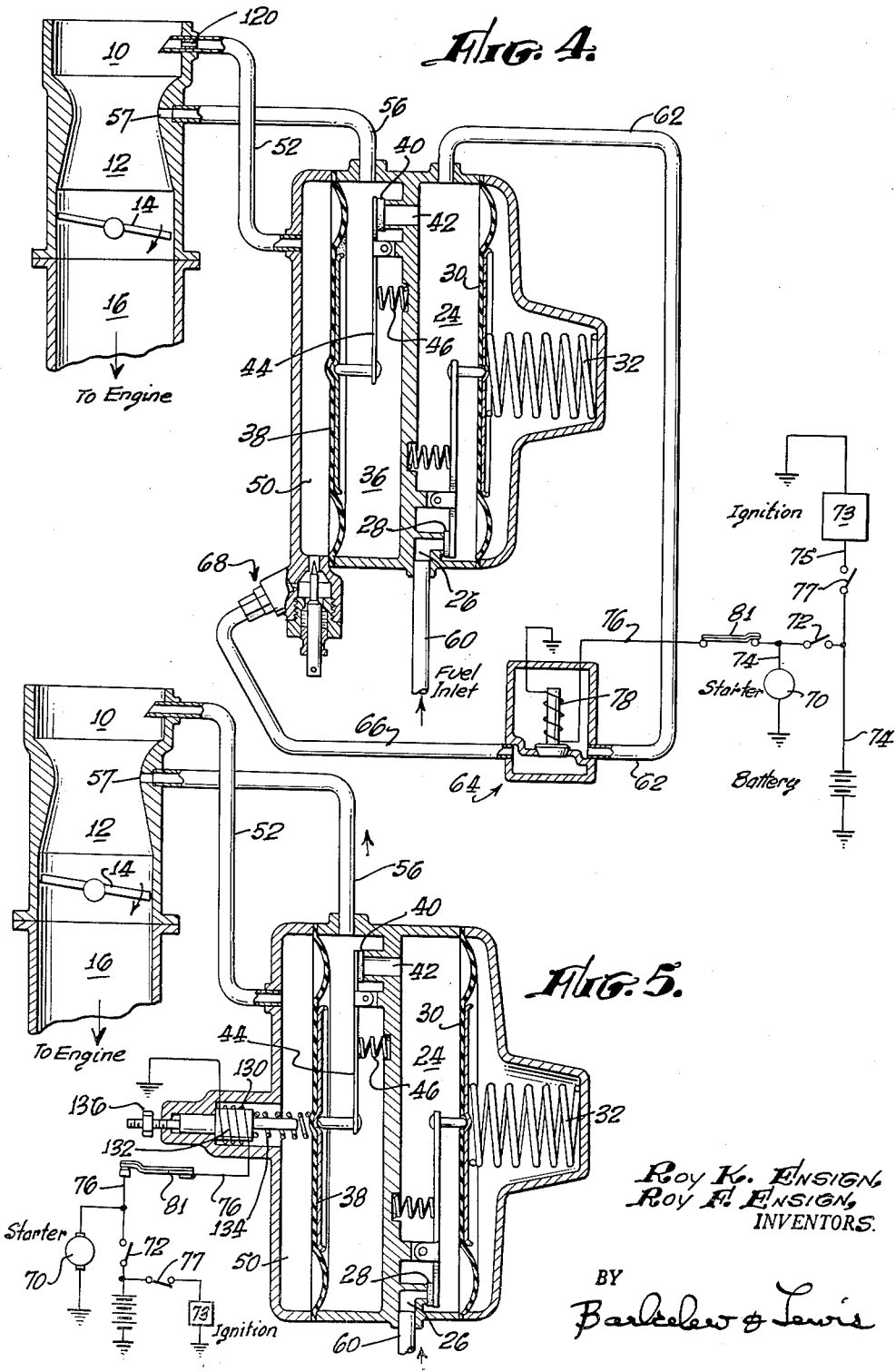

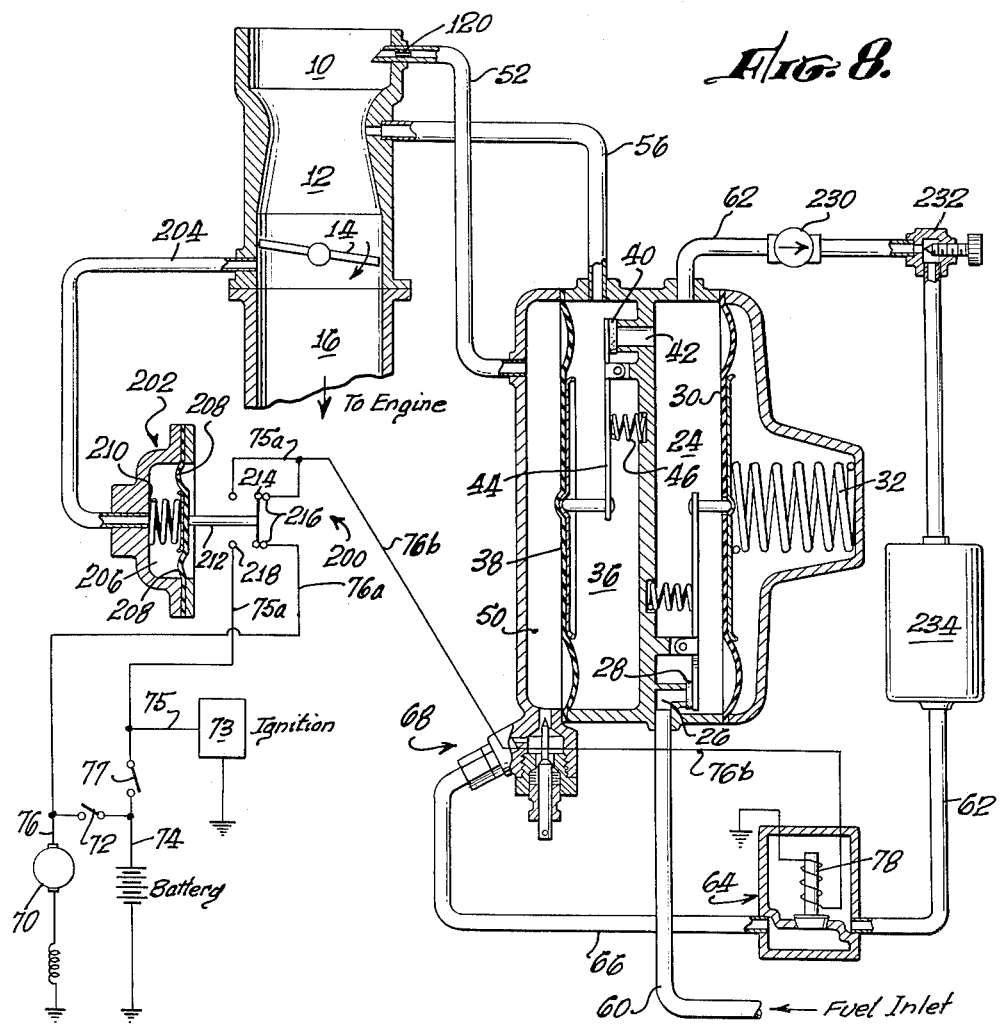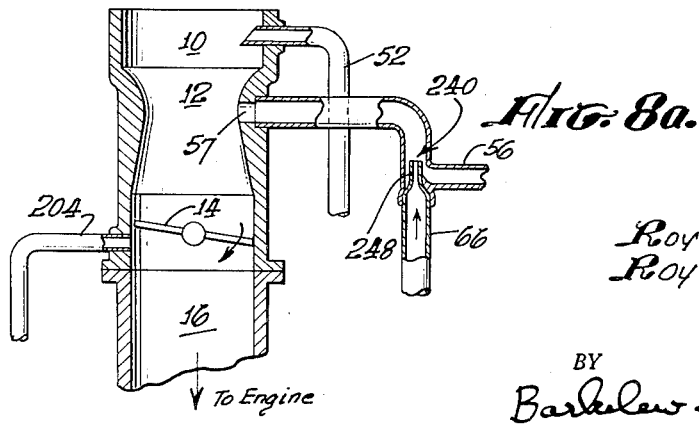

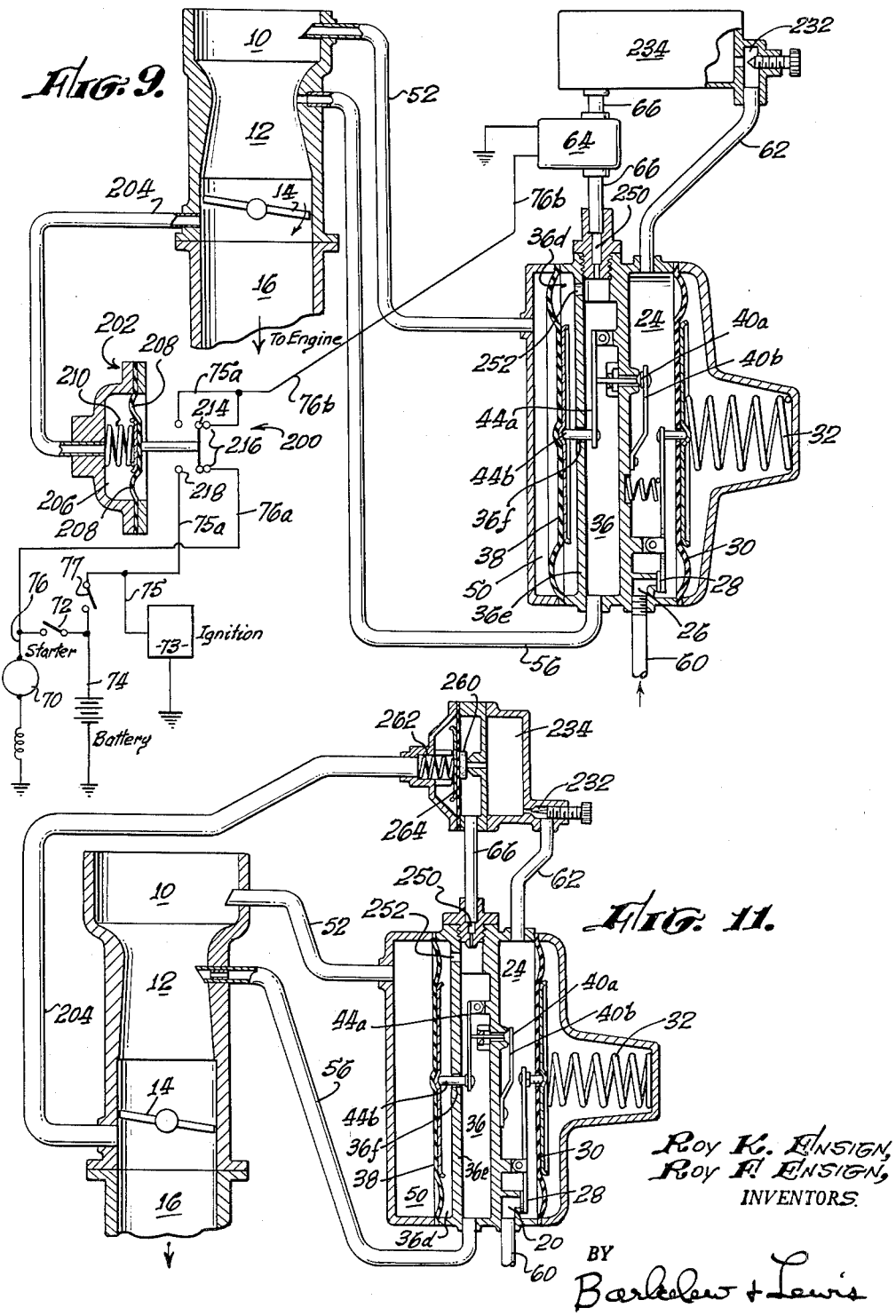

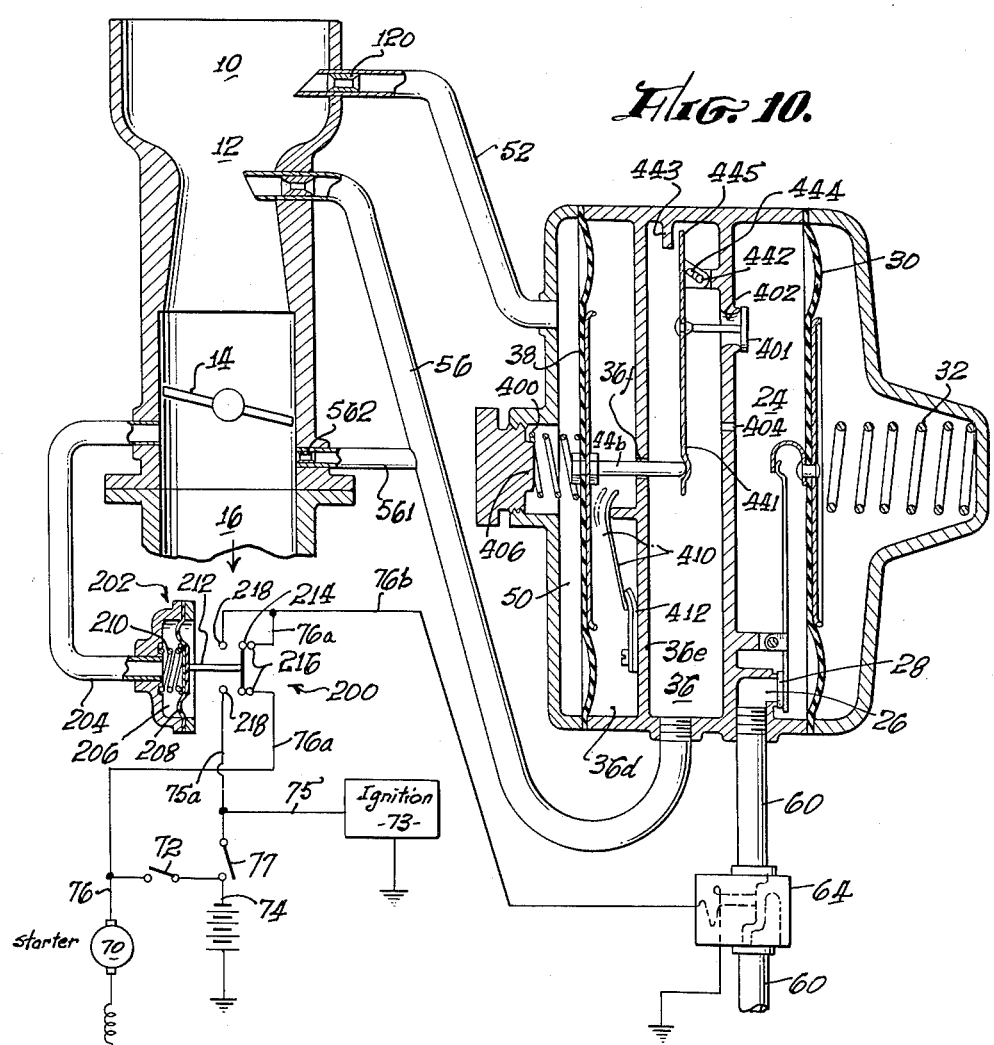

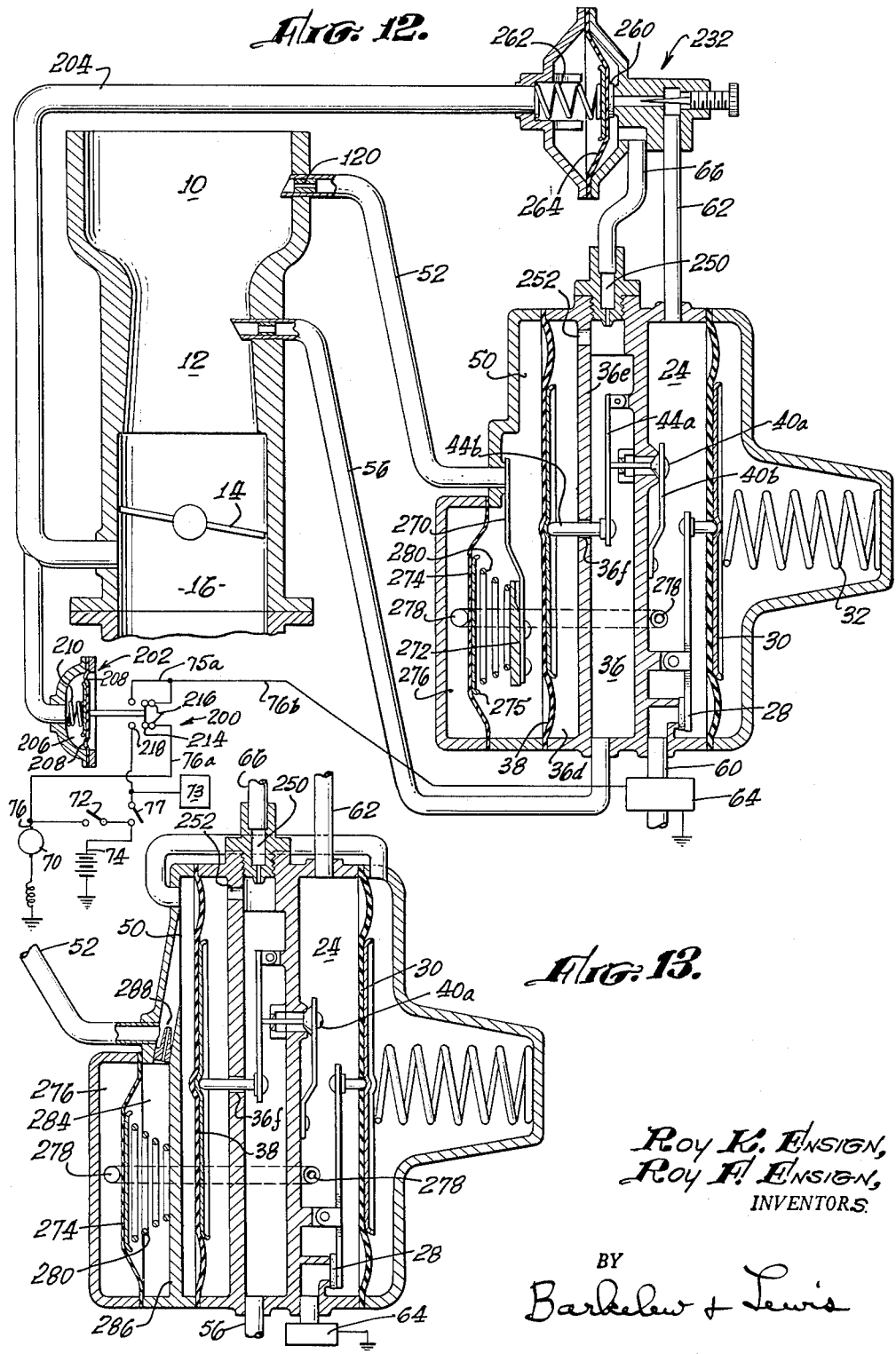

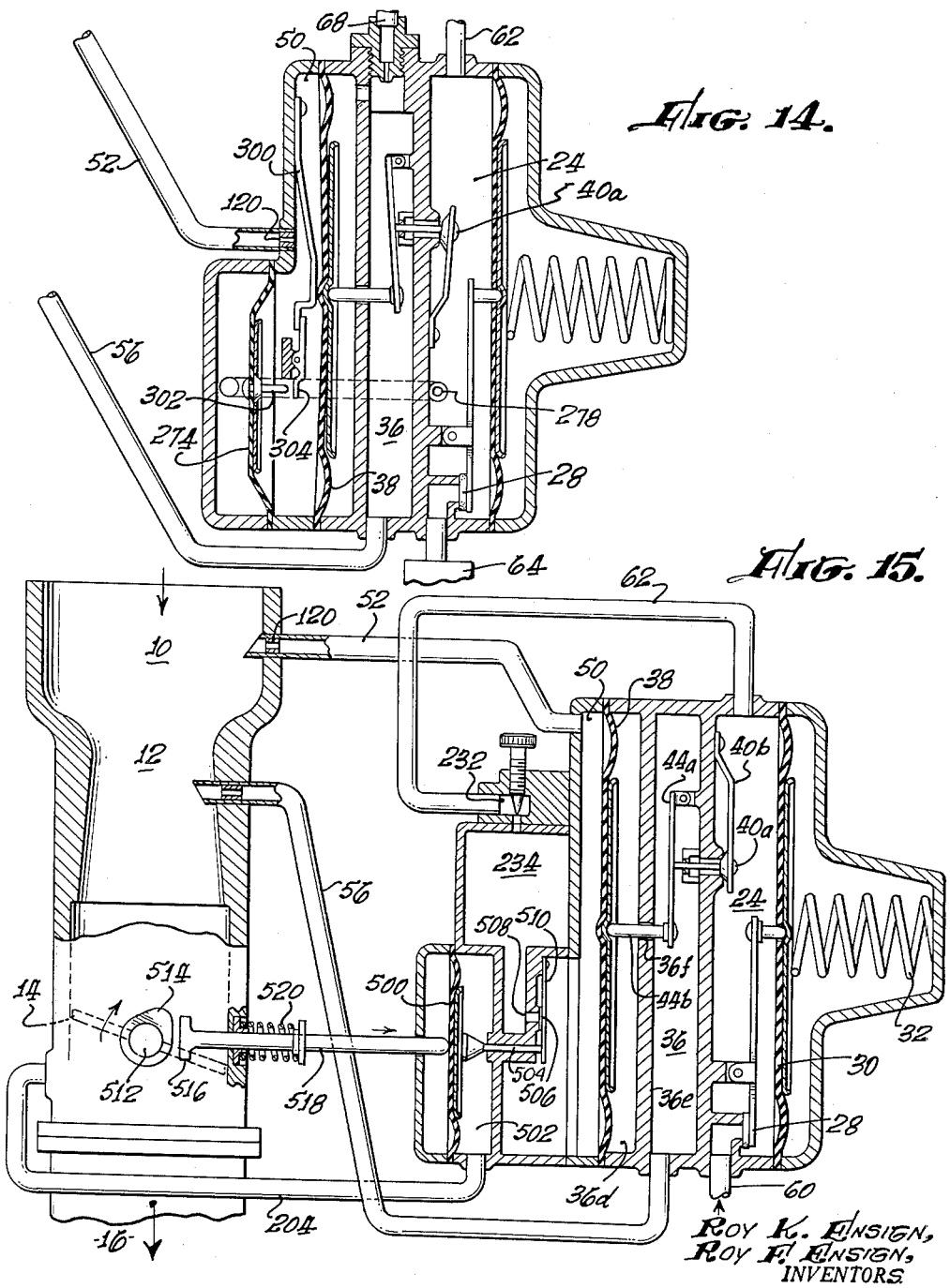

This application is a continuation in part of our application Ser. No. 687,812 filed October 2, 1957, now abandoned.

This invention relates to gaseous fuel feed systems for internal combustion engines, and more particularly to starting systems therefor. A general object of the invention is to provide a simple and automatically operating starting system, method and apparatus, that will function to insure starting either with the throttle closed down, or only partially open, or with the throttle open as is usual with governor controlled engines. In some of its forms the invention also provides an idling system, as will appear.

The invention provides an extremely simple method and apparatus that does away with the necessity for automatic starting chokes and all similar devices for insuring starting fuel feed to the engine on its slow starting turnover.

In typical gaseous fuel feed systems, a pressure regulator, or the last stage of a multi-stage regulator, is commonly set to deliver fuel to the air-and-mixture passage of the engine carburetor normally at or about atmospheric pressure or at a slightly sub-atmospheric pressure, say a minus pressure of one-quarter inch of water. On slow turnover of the engine for starting the venturi throat depression, or velocity depression, in the carburetor may not be sufficient to draw in enough starting fuel.

The present invention solves that problem by the very simple operation of raising the fuel pressure of the feed to the carburetor in a timed pulse actuated in conjunction with starting turn-over. Inception of the increased pressure pulse may be caused or actuated by any of various operations normally accompanying starting turn-over. Typically, the pulse inception may be caused by energization of the starting turn-over system—by energization of the circuit of the starting motor or of the ignition; or by the intake manifold depression accompanying starting turn-over. Or it may be caused by the throttle or choke manipulation where that takes place in connection with starting turn-over. As will be seen from the following descriptions, the pulse inception may be caused either manually or automatically.

The pulse inception, as will become apparent from the following descriptions, need not be simultaneous with the initiation of the starting turn-over. The illustrative embodiments of the invention described here are typical of pulse inception control by some operation that takes place in conjunction with engine turn-over. Illustrations of preferred embodiments given here include pulse initiation by initial energization of the starting system or by the manifold depression occurring on starting turn-over; but the invention in its broader aspects is not necessarily limited thereby. In connection with pulse initiation by virtue of energization of the starting system; it will be understood that the initiation may be caused by energization of either the starting motor circuit or of the ignition circuit which, as a part of the starting system, is necessarily energized together with energization of the starting turn-over motor.

The system of the invention also has another closely related function of the timed pulse of increased pressure. As will be seen from the following descriptions, the pulse of increased pressure, where it is applied in any manner, directly or indirectly, to the delivery chamber or passages of the regulator, operates to quickly flush out any air that may have accumulated in those delivery parts. And in some forms the pulse system provides idling fuel or a continuous flow of fuel at idle rate when the throttle is open during starting.

Illustrative preferred embodiments are described in the following with reference to the accompanying drawings, in which:

FIG. 1 is a schematic showing of one preferred form of the system;

FIGS. 2, 3, 4 and 5 are schematic showings of other, modified, preferred forms of the system;

FIGS. 6 and 7 are views showing modified forms of timing valves;

FIGS. 8 to 10 are schematic showings of further modified, preferred forms of the system;

FIG. 10a is a fragmentary showing of a modification of FIG. 10, and

FIGS. 11 to 15 are schematic showings of further modifications.

In the drawings, referring first to FIG. 1, a typical carburetor has its air intake at 10, venturi throat at 12, throttle at 14, and connection to the engine manifold at 16.

A typical two-stage regulator is here schematically shown. As remarked later the regulator can be of single stage. As here shown, the regulator has a first stage chamber 24 to which gaseous or volatile fuel is admitted from high pressure intake 26 under control or inlet valve 28 operated by diaphragm 30 and reference pressure spring 32. The lever system between the diaphgram and valve is such that the spring pressure tends to open the valve while fluid pressure in 24 tends to close it. The pressure maintained in 24 is controlled by the pressure of the reference spring, which is commonly set for about six to eight pounds p.s.i. in 24.

The second-stage delivery chamber 36 receives fluid via port 42 from first-stage chamber 24, under control of valve 40 operated through lever 44 by diaphragm 38. The reference pressure on diaphragm 38 is commonly either atmospheric, or preferably the total pressure in air intake 10 picked up by balance tube 52 and transmitted to the reference chamber 50. A spring 46 may exert pressure on the diaphragm-valve system; and that spring may be set so that the diaphragm-valve system may be in balance with pressure in 36 substantially equal to, or somewhat higher than, that in 50 (atmospheric pressure or the effective pressure at the air intake) or to require a relatively lowered pressure in 36 to balance or open valve 40. For example spring 46 may be set to exert a valve closing pressure on the system such that the pressure in delivery chamber 36 must be lower than that in reference chamber 50 by a chosen amount—say one-quarter inch of water p.s.i.—to put valve 40 in balance or open it. Spring 46 then automatically closes valve 40 when the engine is standing and pressures on the opposite side of diaphragm 38 are equal. Delivery tube 56 connects delivery chamber 36 with the air and mixture passage 10, 16 at venturi throat 12. Thus, if the system is set to deliver at sub-atmospheric pressure, the depression at venturi throat 12 with relation to the effective pressure at air intake 10 must be at least equal to that difference in pressure in order to open valve 40 and draw in any fuel at all. The venturi throat depression is commonly less than that on starting turn-over. If the system is set to deliver at substantially atmospheric pressure, the venturi throat depression is normally insufficient to draw in enough fuel for quick starting. Our starting system provides temporarily for enough fuel regardless of the regulator setting.

As applied to such a typical fuel feed system our starting system is now described in several illustrative forms.

In FIG. 1, initial high pressure line 60 leads to the regulator (to the first stage inlet 26, as here illustratively shown). That line, or what amounts to a branch of it, 62, leading from the first stage chamber 24, leads to a normally closed valve 64, from which a line 66 leads to an adjustment valve 68 that discharges, as shown here illustratively, into the second stage delivery chamber 36. Valve 64 is automatically opened, as illustratively shown here, when the starter system is energized to turn the engine over for starting. As here shown in illustrative form, that valve is solenoid operated in the starting motor circuit. For example, the starter motor is shown at 70 controlled by starter switch 72 in wire line 74. A branch 76 of that line leads to the solenoid winding 78. Circuit for ignition system 73 is shown as branch line 75 controlled by switch 77, which is closed at or before starter switch 72 closure. Assuming switch 81 in line 76 closed— its function will be described later—valve 64 will be open whenever starter motor 70 is energized to turn the engine over.

With that valve open, fuel at relatively high pressure (here, illustratively, the pressure in first stage chamber 24) will be fed to adjustment valve 68 and thence into second stage delivery chamber 36 and from that chamber via 56 to the venturi throat. Adjustment valve 68 is, in general, set so that the amount of fuel delivered is sufficient to raise the fuel pressure, in the interconnected chamber 36 and line 56 and at the venturi throat port 57, substantially to or somewhat above the effective pressure at air intake 10. That increased pressure (assuming switch 81 is still closed) continues as long as the starter motor is energized and turning the engine over. As soon as the engine starts, starter switch 72 opens and valve 64 closes. The engine, then operating, draws fuel from delivery chamber 36 at its set delivery pressure. If the engine starts at idling speed with the throttle closed down, an idling by-pass of any suitable known type can be used to feed sufficient idling fuel, if necessary. If the engine starts with the throttle open and goes immediately to full operating speed (e.g. under governor control) no such idling by-pass is at all necessary.

Valve 64 in full effect discharges to venturi port 57, via control valve 68. While its discharge can go direct to the venturi throat, it may be preferred to have it discharge to the venturi via delivery chamber 36 and line 56 so as to clear out of those parts any air that may have entered while the engine stands idle.

In order to insure reliable operation it is preferred that the pressure of feed to valves 64 and 68 be fairly uniform. Thus, although not necessary, that pressure may be the regulated pressure of a first regulator stage, as shown. However, with the provisions now to be spoken of, that pressure can vary quite widely and may even be taken directly from high pressure line 60 or any other suitable source of relatively high pressure. In such instance, the regulator may be single stage. It is to be understood that, in all the illustrative embodiments here described, the first stage is merely a preferred pressure feed to the delivery stage and to the pulse system.

The switch 81, in series with starter switch 72, controls solenoid valve 64. Switch 81 may be a manual switch, normally closed, or closed at the same time starter switch 72 is closed, and afterwards opened by hand while the starter is still operating. Or, preferably, it may be a normally closed thermostatic switch, preferably of the kind that snaps open and then snaps closed again after an interval, and that opens automatically at a set interval—say, a few seconds—after switch 72 is closed, to close valve 64 at a suitable predetermined time interval after the valve opens. In either case with such a timed valve, operation is as follows.

Adjustment valve 68 may be set to provide fuel for the desired starting mixture for the fastest engine turn-over and the lowest feed pressure to it. Or it may be set to provide an overly rich mixture under those conditions. In either case, it will provide an overly rich mixture if the engine is turning over more slowly, or if the feed pressure is higher. If then, switch 81 opens while the starter system is operating, valve 64 will close and the fuel pressure at 57 will drop off. The richness of the mixture in the venturi will also correspondingly drop, and when it reaches combustible proportions the engine will start. A timed pulse of starting fuel at a higher than normal pressure is thus supplied to the carburetor. And timing switch 81 automatically provides for surety of starting under such variable conditions as mentioned above, or without requiring any great accuracy of setting for adjustment valve 68. The valve at 68 is preferably adjustable, as shown. However, once the orifice size of that valve is ascertained and the valve set, it is in effect a fixed orifice and can be substituted by a simple fixed orifice of chosen size. This is particularly true in the system equipped with such a time control as switch 81.

The starting motor and the ignition system and their circuitings, as shown in FIG. 1 and the other figures comprise what is here referred to as the starting or starting turn-over system for the engine. As is well understood, both the starter motor and the ignition must be energized for starting—the starter switch 72 and ignition switch 77 must both be closed. Consequently, in the form of FIG. 1, the operation would be the same if line 76 to valve 64, controlled by time control 81, were connected into ignition branch 75 controlled by ignition switch 77, instead of into the starter line, or were connected into both 74 and 75 selectively, as will be explained later. In any such case valve 64 will be initially opened and the pressure pulse started, on energization of the starting system, and the pulse feed then shut off by timing.

FIG. 2 shows a modification of the system of FIG. 1 incorporating a pressure operated timed valve instead of the electrical timing control of FIG. 1. FIG. 2 shows the regulator, and carburetor, and a solenoid valve 64 the same as in FIG. 1, with the same numerals. In FIG. 2, the thermostatic timing switch of FIG. 1 is omitted and the timing control is performed by the valve P controlling the tube line 66 leading from solenoid valve 64 to delivery chamber 36. And the electrical actuation of solenoid valve 64 is also modified.

As shown in illustrative form, valve P has a movable valve closure 80 which normally (when inactive) occupies a position removed from its valve seat 82. It may be moved to that position by gravity, as here illustrated, or by a light spring. Closure 80 is connected by stem 84 to a pressure operated member 86, such as a leaky diaphragm or piston, here illustrated as a disk fitting loosely in cylinder 88, and forming an effective dash pot. Cylinder 88 is closed except for its communication with valve chamber bore 90 via the port 92 within valve seat 82. Valve closure 80 need not fit bore 90 closely. Its lower position (position furthest away from seat 82) is suitably limited, as by the stop 94. Tube 66 from valve 64 leads to bore 90 under the lower position of 80. A passage 96 leads from that lower end of bore 90 to the upper part of the bore, adjustably controlled by needle valve 68a. Tube 66, controlled by the valve P, then leads on from port 92 above seat 82, to delivery chamber 36, as in FIG. 1.

Operation is as follow. Solenoid valve 64 opens when the engine starting system is energized, as explained below. Fuel under pressure from line 62 is fed via 64 to bore 90 under valve closure 80 which then, acting as a piston, moves up at a rate primarily controlled by the dash pot 86, 88. During that movement, together with what fuel may leak past 80, fuel passes through passage 96, controlled in amount by valve 68a, to the upper part of bore 90 above 80 and thence via 92 and 66 to delivery chamber 36. When 80 seats on seat 82 the fuel flow through 96 and past 80, to 36 is cut off, (except for what may leak through the small notch 100) and the fuel pressure at the venturi throat falls, as described in connection with FIG. 1.

In the system as shown in FIG. 2, the solenoid valve 64 may be in the starter circuit only, as in FIG. 1. In that case that valve will close when the starter switch 72 opens as the engine goes into normal operation. Then the pressure in 90 will bleed off through notch 100 to 36 and the venturi.

On the other hand, in this system of FIG. 2, solenoid valve 64 may be controlled by the ignition circuit or by both the starter and ignition circuits. FIG. 2 shows starter motor 70 and ignition 73 controlled by their switches 72 and 77, as in FIG. 1. It also shows a switch 200 operated by a diaphragm device 202 which is actuated by manifold depression, or the depression in the air and mixture passage. As illustratively shown here, a passage 204 leads from the carburetor passage at a point beyond the throttle 14 to be subject to manifold depression. If a pressure dropping air cleaner or similar obstruction is used on air intake 10, tube 204 may communicate the manifold depression by taking off at any point in the air and mixture passage, either ahead of, or after, the throttle. And in that case actuation control of valve 64 may be solely performed by such a switch as 200. These remarks apply to any of the system forms described here and incorporating a switch such as 200 in the control.

Tube 204 communicates depression to a small diaphragm chamber 206 which has a diaphragm 208 pressed out by a light spring 210. Diaphragm stem 212 carries a switch contact 214 that normally engages contacts 216 to close the line 76a that leads from starter line 76 to line 76b going to solenoid valve 64. Upon diaphragm 208 being drawn in against the pressure of spring 210 by the depression communicated by 204, switch contact 214 moves to engage contacts 218, to close line 75a leading from ignition line 75 to valve line 76b. Spring 210 preferably exerts such pressure that diaphragm 208 will be moved, and switch 200 thrown, by at least the smallest depression transmitted through 204 during any stage of normal engine operation. That is preferred; but the spring may be light enough that switch 200 is immediately thrown even by the depression created during starting turn-over by the starter, particularly if a pressure-dropping air cleaner is used. In that case, as mentioned before, the switch 200 (216, 218 and 214) may be the sole control of actuating current feed via 76b to valve 64. That can be envisaged by assuming line 75a to be directly connected to battery lead 74 without the intervention of switch 77. This observation applies to all forms here described and employing a manifold controlled switch. As so operated, valve 64 is opened by direct virtue of starting turn-over of the engine instead of directly by virtue of energization of the starting system. In either case valve 64 is opened and the pressure pulse started in conjunction with starting turn-over of the engine. This applies also to FIG. 1 and to all other figures, as will be apparent.

In the specific illustration shown here, operation is as follows. On starting, both starter switch 72 and ignition switch 77 are closed. Then, with switch 200 in the position shown, the starter circuit energizes valve 64 to open it. Switch 214 may then immediately throw to close the ignition line 75a, or it may not throw until the engine starts normal operation and starter switch 72 opens. In either case, line 76b and valve 64 are then energized from the ignition line and continue to be energized from that line as long as the engine is in operation. If switch 200 throws immediately on starting turn-over, valve 64 is essentially controlled by that switch only—connection of that switch with the starter circuit may be omitted, and switch contact 218 may be connected directly to the battery without the intervention of ignition switch 77.

With valve 64 open throughout engine operation, the timing valve P has continuous pressure applied to it and valve closure 80 remains in its upper position on its seat 82. The small continuous leak at 100 is then sized to provide the extra fuel needed for idling. In the event the engine stops with ignition switch 77 still closed, the switch 200 moves to break ignition line 75a. Valve 64 then closes to shut off the leak through valve P and the pressure in 90 then bleeds off through 100.

The rate at which 80 moves toward its seat, and consequently the time period of the fuel pulse, is controlled mainly by the action of dash pot 86, 88. Adjustment of 68a has a minor effect on the timing.

In this form of the system, solenoid valve 64 need not close when the starting motor is deenergized. Starting fuel flow to the venturi is cut off by the timed closure of valve P and valve 64 can then remain open until the engine stops. Thus, it can be energized also in the ignition circuit, or by the vacuum switch 200, as described.

In any system form in which the timed valve utilizes a dash pot, as in FIG. 2, a thermostatic control may be used to shorten the time period as the engine, and the valve located on or close to it, warm up. Thus, as indicated in FIG. 2, there may be a bleed port 102 through 86, and a bi-metallic strip 104 may act to close that port at lower, and open it at higher, temperatures. And the thermostatic switch 81 of FIG. 1 may act in the same manner by being heated by engine heat to then open more quickly when the engine is hot.

FIG. 3 shows a form of the system more particularly adapted to feed fuel systems where the regulator is set to deliver at, or even above atmospheric pressure and where the regulator valve 40 will thus not automatically close or close tightly when the engine is standing. For example, valve spring 46 may be omitted entirely, or set to exert a pressure less than that necessary to hold valve 40 closed against the fluid pressure on it tending to open it.

In general, the system shown in FIG. 3 is the same as that in FIG. 2 (with the same numerals) except that valve 64 controls the initial feed to the regulator, and timing valve P is fed with pressure fuel directly from 62, or 60. Valve 64, is here shown as the same as in FIGS. 1 and 2 and controlled as explained in connection with FIG. 2, to be opened in conjunction with starting turn-over of the engine and to remain open throughout engine operation. As before remarked, the feed from 60 may go directly to the delivery stage valve 40 and also directly to 62. In this system of FIG. 3, as in FIG. 2, valve 64 may be controlled solely by energization of the ignition line, or solely by switch 200, but it is here shown as controlled by the same system as in FIG. 2 with operation as there described. If switch 200 throws immediately on start of starting turn-over, valve 64 is then essentially controlled only by the ignition line or switch 200, as has been explained in connection with FIG. 2.

When valve 64 opens fuel under pressure is fed to the regulator and, via 62 (which is, as stated before, an effective branch 60) to the timed valve P. That valve then immediately acts to supply the starting fuel pulse to the venturi, as explained for FIG. 2. At the same time, the regulator fills with fuel, ready for delivery as the engine starts. When the engine stops with the circuit of valve 64 opened at either 77 or 200, valve 64 closes, acting as a shutoff valve to cut off fuel feed to the regulator. The small amount of fuel then in the regulator may then be drawn off by the engine as it slows down to stop.

In this form of the system, as also in FIG. 2, valve P remains closed during normal engine operation and fuel in small amount may continue to leak to the venturi throat through the bleed notch 100, in a small constant amount that may form a part of the idling fuel for the engine. In place of, or in addition to, notch 100, a passage 101 may be provided, adjustable by valve 101a, to provide the idling fuel.

As will be noted below, the timed pulse discharge in any of the systems here explained may either go to the venturi via the regulator chamber, or directly to the venturi, or to the reference chamber 50 to raise the pressure there and correspondingly raise the pressure for a pulse in the delivery chamber. And, as explained in connection with FIG. 4, if the leak through 100 and/or 101 is continuous and goes to the reference chamber, it has the function of continuously raising the delivery pressure a small amount.

FIG. 4 shows one of the modifications that may be applied to any of the systems here explained. The parts of the system here illustratively shown are the same as in FIG. 1, except that line 66 leading from the timed valve (valve 64 of FIG. 1, or P of FIGS. 2 and 3) leads to the reference chamber 50 of the delivery controlling diaphragm 38. Pressure branch 62 leads to the timed valve, either directly to timed valve 64 as in FIG. 1, or to the timed valve P of FIG. 2, via valve 64, or directly to valve P as in FIG. 3. The timed pulse of fuel under pressure from the timed valve momentarily raises the reference pressure in 50 and consequently raises the delivery pressure in 36 and at the venturi, correspondingly in a timed pulse. The amount of that pressure increase is regulated by the setting of adjustment valve 68 or 68a, balance tube 52 either constituting a calibrated bleeder orifice, or containing one, as at 120. The small amount of fuel bleeding through the balance tube into the air intake forms a part of the fuel of the starting pulse, the remainder coming from the raised pressure in 36 to the venturi.

In the system with 66 connected either to delivery chamber 36 or to reference chamber 50, the fuel pressure from 66, or the fuel admitted at valve 40 at higher than normal pressure, tends immediately to clear out any air that may have accumulated in 36 with the engine standing. It does that directly when 66 is connected to 36. It does it, when connected to 50, by putting opening pressure on valve 40 to flush fuel through 36 at higher than normal pressure.

FIG. 5 shows a further modified system for providing the temporary starting fuel pulse by increasing the reference pressure on the delivery controlling diaphragm. The regulator itself is here shown the same as in FIG. 1 and may be set to normally deliver at either below, at, or somewhat above atmospheric pressure. A solenoid plunger 130 is moved by energization of its winding 132 in a direction (to the right in the figure) to compress spring 134 and apply the spring pressure to diaphragm 38 as an additional reference pressure tending to open valve 40. The amount by which the spring is compressed, and the spring pressure exerted on the diaphragm, may be adjusted by any suitable means; for example by an adjusting nut 136 limiting the plunger movement. Solenoid winding 132 is connected, via the thermostatic switch 81 into the circuit 74 of starter motor 70, controlled by starter switch 72. On closing the starter switch, with timing switch 81 normally closed, energization of the solenoid applies the adjusted spring pressure to diaphragm 38 to raise the pressure in delivery chamber 36 and at the venturi. After the short chosen time interval timing switch 81 opens, relieving the temporarily applied spring pressure from the diaphragm and allowing the pressure in 36 and at the venturi to fall to normal. With an adjusted applied spring pressure sufficient to raise the pressure at the venturi to produce a somewhat overly rich mixture, then the engine starts, as in all the other system forms, when the pressure drops through that for correct starting proportions.

The method here explained for applying physical reference pressure in a timed pulse to the pressure regulating diaphragm may be used in any of the other general systems here described wherever appropriate.

FIGS. 6 and 7 show modified forms of the timing valve P. In FIG. 6 the valve closure 80a fits bore 90a loosely but still closely enough to act as a piston when pressure is applied via tube 662, that corresponds to 66 of FIGS. 1 and 2 or 62 of FIG. 3. Closure 80a is connected by stem 84a to diaphragm 86a which is located between two chambers 88a and 88b. Those chambers are interconnected by a restricted passage 102a, to regulate and control the speed of diaphragm and closure movement when 80a is forced up. A light spring 89 moves the diaphragm and closure to the position shown when the pressure through 662 is cut off. The diaphragm and its intercomunicating chambers constitute a dash pot having the same function as 86, 88 in FIGS. 2 and 3, delaying the seating of 80a on its seat 82a to close port 92a.

During upward movement of 80a, the fuel that leaks past its loose fit goes to 66b and thence to the regulator and/or the venturi as previously described. If desired, an adjustment valve 68b may be used.

In FIG. 7, the valve closure 80c fits bore 90c with clearance. Diaphragm chamber 88c of diaphragm 86c has a restricted opening 102c leading to 66c that goes to the regulator as previously described. The tube 662, corresponding to 66 of FIGS. 1 and 2 or 62 of FIG. 3 communicates directly with diaphragm chamber 88d and applies pressure to the diaphragm at all times that pressure is in 662. When pressure is thus applied (as by the opening of valve 64) fuel in quantity restricted by either orifice 67 or port 69 at the valve seat goes, via chamber 88d to 66c and thence to the regulator or the venturi. The speed of valve closure, cutting off that fuel feed, is controlled mainly by the sizes of 102c and 67 or 69. As in FIG. 6, the light spring 89 returns the parts to the position shown when pressure via 662 is cut off.

If the timed valves of FIG. 6 or 7 are used in the system controlled by the ignition circuit, or by manifold depression, so that pressure is always present in 662 during all engine operation, provision may be made, as in FIG. 3, for providing idling fuel, or for continuously raising delivery pressure. For example, the valve seat in FIG. 6 may have a notch 100b, like 100 in FIG. 3. And in FIG. 7, an adjustable by-pass 100c may provide a limited pressure flow to 66c when valve 80c is closed. With any of these timing valves used in the system of FIG. 3 the continuous supply of pressure via the restricted notch or by-pass to the venturi, or to either the delivery chamber or the reference chamber of the regulator, raises the delivery pressure to provide fuel for idling.

FIG. 8 illustrates another means of timing the fuel pulse. In this figure the general system, as regards the regulator, carburetor and control circuiting is, illustratively, the same as in FIG. 2, and the same numerals are applied as in that figure. As in FIG. 2, the timed pulse is under initial control by the starter and ignition circuits, or the ignition circuit or the vacuum switch, alone. However, as will be explained, it can be controlled by the starter circuit alone.

In this FIG. 8 the passage line 62, in effect a branch of intial feed line 60, goes through a check valve 230 and an adjustable needle valve 232 (or equivalent restricted orifice) to a small tank 234. From that tank the line 62 leads on to the solenoid valve 64 and from that valve the passage line 66 leads on to reference chamber 50, as illustratively shown here. Valve 64 is controlled by the starter and ignition circuiting, or by the ignition circuiting or switch 200, alone, as described in connection with FIGS. 2 and 3, so that it is opened, as before explained, in initial starting turn-over of the engine, and (preferably) remains open while the engine is normally operating; closing when the ignition circuit or switch 200 is opened, when the engine stops.

In operation, tank 234 fills by feed through the restriction at 232 to the pressure existent in the first regulator stage (or to the pressure existent in line 60). The tank is thus normally full at such pressure. Then, when valve 64 is opened, tank 234 starts discharging through 64 and 66 to reference chamber 50 where the increase in pressure may be controlled by adjustment needle 68 (or equivalent orifice) and the orifice 120 in balance tube 52. That increase in pressure falls off as the pressure in tank 234 falls; the restriction at 232 being small enough that flow through it is considerably smaller than outflow to 50. The time period of the pressure pulse in 50, and in delivery chamber 36, is controlled primarily by the capacity of tank 234, the time period lasting until the pressure in that tank is lowered to substantially the normal pressure in 50. As before explained, the various restrictions are so related that, on initial opening of valve 64, the pressure in 50, and the delivery pressure, will be above normal; and then as the pressure falls the engine starts as combustible proportions are reached.

With valve 64 remaining open during engine operation, the slow continuous flow through restriction 232 may provide for idling fuel by slightly raising the normal pressure at the venturi. On the other hand, if valve 64 is here controlled by the starter circuit only, it will close immediately after the engine starts, and then tank 234 will fill again.

The function of check-valve 230 is merely to hold the pressure in tank 234 with the engine standing and valve 64 closed, if for any reason the pressure in 60 or the first stage chamber 24 should drop.

Tube 66 in FIG. 8 can of course go directly to delivery chamber 36, as in other figures. And FIG. 8a shows how tube 66, fed with a timed pulse of fuel pressure controlled by any of the systems here explained, may go directly to the venturi, preferably via an ejector arrangement 240 whereby the pulse flow from 66 also draws fuel from delivery tube 56 and chamber 36 and projects that fuel along with the pulse fuel through venturi port 57, thus aiding in clearing out any air from the delivery chamber.

It is remarked generally, that in any of the systems here described, the timed pressure pulse may go either to the regulatory delivery chamber as shown in some figures, or to a reference chamber as shown in other figures, or directly or indirectly to the air and mixture passage of the carburetor.

FIG. 9 shows another system, similar in general to that of FIG. 8, with the similar elements given the same numerals. In addition to the regulator parts shown in FIGS. 1 and 8, the regulator here in FIG. 9 has a wall 36e that divides a delivery sub-chamber 36d, at the inner face of diaphragm 38, from the main chamber 36. Valve 40a is shown as opening against the pressure in 24, closed by light spring 40b and pushed open by valve lever 44a when diaphragm 38 moves into chamber 36d. A push pin 44b connects the diaphragm and lever 44a, passing through an opening 36f in wall 36e, preferably with clearance. That clearance performs the function of a calibrated leak between 36 and 36d, so that, standing, the pressures in 36 and 36d will tend to increase the pressure in 36; just as an increase in pressure in 50 will do so.

Tank 234 is normally filled with fuel under pressure via the calibrated orifice at 232 in the manner explained in connection with FIG. 8. Tube line 66 leads through valve 64 (same as before explained) to a nozzle 250 that discharges into delivery chamber 36 in ejector relation to an opening 252 in the division wall 36e. Valve 64 is controlled in the same manner as that valve in FIG. 8, opening on initiation of turnover and may remain open during engine operation. When valve 64 opens the timed pulse from tank 234, flowing through nozzle 250 clears chamber 36 out, and by ejector action lowers the pressure in 36d, causing valve 40a to open and raise the pressure in 36; and at the venturi, to above normal. As tank 234 empties the pressure in 36d rises and that in 36 falls. When the engine starts, valve 64 may still be held open, and the small flow through 232 and 250 may influence the pressure in 36d to provide a slightly higher than normal pressure in 36 for idling.

As remarked above, valve 64 in FIGS. 8 and 9 may be initially controlled by the starter circuit only. In that case, when the engine starts, as the pressure pulse falls, valve 64 closes when the starter circuit opens.

FIGS. 10 and 10a show systems wherein the timed pressure pulse is generated in the regulator itself by certain provisions in the regulator as will be explained.

FIG. 10 shows an overall system similar to that in FIG. 3 where the controlled solenoid valve 64 controls the initial fuel feed to the whole system. The parts of FIG. 10 similar to those of FIG. 3 are given the same numerals. The regulator is generally similar to that shown in the other figures but with the following described special arrangements. Initial control valve 64 opens an engine starting turnover and remains open during engine operation, as in FIG. 3.

Second stage valve 401 opens against the pressure in 24, operated from diaphragm 38 through valve lever 441 which normally is pivoted at 442 (the pivotal arrangement is explained later.) With the engine standing and the feed cut-off valve 64 closed, a light spring 400 holds valve 401 wide open. On initial opening of the control valve 64 by virtue of initiation of engine turnover, fuel under pressure flows into 24 and, through the then open valve port 402, into delivery chamber 36 and thence to the venturi via 56.

The functioning in FIG. 10 will first be explained as if 36 and the sub-chamber 36d formed one open chamber; that is, as if the sub-division wall 36e were omitted or the communication at 36f between 36 and 36d were wide open.

With valve 401 open, the pressure in 24 (or the initial feed pressure) exerts relatively little closing force directly on it; so that valve remains open more than normally until the pressure in the chamber 36, 36d, building up to higher than normal pressure, acting on diaphragm 38, moves valve 401 to its normal more nearly closed position. In that normal position of valve 401, the pressure in 24 exerts a larger valve closing force on that valve; and with that larger valve closing force, the whole valve diaphragm system controls the pressure in 36, 36d at normal. In the meantime, until valve 401 closes down, the pressure in 36 is higher than normal, until diaphragm 38, slowed in outward movement by the restriction at 120, has allowed valve 401 to close down. Thus fuel under higher than normal pressure has flowed from 36 to the venturi until valve 401 closes down, when the pressure drops and the engine starts. The normal operating pressure in 36 is then maintained by the balance of the forces on valve 401 and diaphragm 38.

When the engine stops normal operation, and valve 64 closes, the normally maintained pressure in 24 may bleed off, through a small leak through valve 401, or through a small bleed orifice such as 404. As that pressure bleeds down toward atmospheric pressure, spring 400 opens valve 401. The system is then in condition to supply the timed fuel pulse upon subsequent starting. The time period of the pulse at higher than normal pressure is controlled by the time required for fluid in 50 to be expelled through 120.

Spring 400 is preferably set by adjusting screw 406 to exert such a valve opening pressure on diaphragm 38, with relation to the normal valve closing pressure on 401, that in normal operation the regulator will deliver at or slightly above atmospheric pressure, or the effective pressure in the air intake. Delivering at such a higher pressure it provides fuel for idling, which, with throttle 14 closed down, is drawn in partly by the then high manifold depression, through the branch 56i and the small idling port 562, from delivery line 56. However, during the slow starting turnover the manifold depression at 562 is usually very low and almost no fuel is drawn in by the slight venturi depression, but is fed in by the pulse pressure. The proportionate amount of fuel for starting may therefore be made larger or smaller (richer or leaner mixture) than for idling; which some engines require.

A spring 410 carried by a bi-metallic thermostatic spring element 412 serves to limit the movement of diaphragm 38 in its valve opening direction—to the right in the figure—when the engine is stopped. These regulators are usually mounted close to the engine so that their temperature rises with engine temperature. When cold, the spring occupies such a position as shown in full lines in the figure; when warmer or hot, such a position as shown in broken lines. In that latter position, spring 400 will hold valve 401 open not so far as when the regulator is cold; and the timed pulse period will thus be shorter and the pulse pressure less with the engine and regulator warm than when the engine is cold.

With valve 401 opening against the pressure in 24, less valve closing fluid pressure in 24 is exerted on it as it opens wider. It therefore, as it opens wider, requires less force variation from diaphragm 38 to move it and less leverage can be used. The pivotal mounting of the valve lever provides for a change in the leverage between the diaphragm and valve as the valve opens and closes; providing for decrease in the leverage of the diaphragm over the valve as the valve opens. In the position of the valve closed or nearly closed the effective lever pivot is at the fixed pin 442 and end of slot 444 as shown. As the valve opens, the end 445 of lever 441 contacts the lug 443, which then provides the lever pivot. The slot at 444 allows the lever to swing about the end pivot at 445; and that slot is canted so as to keep valve 401 substantially axial of port 402 as the valve moves further off its seat.

The main advantage of this leverage changing arrangement is that very good and close regulation is attained at low venturi suctions when valve 401 is most nearly closed, the fuel flow is small, and the operating suction on the regulator diaphragm is small.

FIG. 10a is a fragmentary detail showing a modification of the valve pivoting arrangement to obtain a progressive change of the pivoting point and a corresponding progressive change in the leverage between the diaphragm and valve. In this figure the valve 401a is mounted on a pivoted arm 401b and is pushed open by a pin 446 seated in the valve and in valve lever 447. The lever has a slot 448 engaging pivot pin 449, the end of that slot riding the pin when the valve is in near closed position. As the lever pushes the valve open, swinging about pin 449, its end portion, at about the point 450 first engages the curved lug 451, forming a pivot at that point. Then, as the lever swings further in a valve opening direction, its end portion engages 451 closer and closer to its end 452. The leverage is thus gradually changed as the valve is opened.

FIG. 10 also shows another pulse producing means, which may function either in combination with the pulse producing system above described for that figure, or may function independently to produce the pulse.

As shown in FIG. 10 subdivision wall 36e separates sub-chamber 36d, at the inner face of diaphragm 38, from the main delivery chamber 36. Chambers 36 and 36d are restrictedly intercommunicated, as by the loose fit at 36f where pin 44b passes through wall 36e, connecting the diaphragm with valve lever 441.

When initial cut-off valve 64 opens, with second stage valve 401 open, pressure in 36 begins to rise. Pressure in 36d rises more slowly than in 36, due to the restriction at 36f. It is the pressure in 36d that moves diaphragm 38 to the left to close valve 401 down, and that finally exerts the fluid pressure on the diaphragm, that, with the valve in its normal operating position, balances all the forces acting on the valve-diaphragm system to maintain the normal delivery pressure in 36 and 36d. But, before pressure in 36d reaches that normal pressure, that in 36 has risen to a higher pulse pressure, which then drops off as the pressure in 36d rises to normal to close valve 401 down.

In this arrangement the pulse is initiated by the valve 64, as in the system previously described. In that previously described system of this figure, the duration of the pulse is controlled by the restriction at 120. In this latter rescribed system the pulse duration is controlled by the restriction at 36f. Both restrictions together, or either one independently, may control the pulse duration.

As before explained, when cut-off valve 64 closes, the pressure in 24 may bleed off through the bleed 404 allowing the system to resume its initial condition, ready to provide another starting pulse on re-opening of 64.

FIG. 11 shows a system similar to that of FIG. 9, except that here the pulse initiation is actuated only by manifold depression on engine turn-over. Corresponding parts are given the same numerals as in FIG. 9. Here, the pulse discharge from tank 234 via 66 to nozzle 250 is controlled by the valve 260, normally closed by spring 262 and opened by manifold depression acting on diaphragm 264 via the tube passage 204. The operation is the same as described in connection with FIGS. 8 and 9; and the pulse discharge from the tank, in any of those figures, may go to the delivery chamber 36, the reference chamber 50, or directly to the venturi, or via the ejector arrangement shown in FIG. 8a. The timing of the pulse here, as in FIG. 9, is controlled by the orifice at nozzle 250. With the engine standing and valve 260 closed, tank 234 is filled through restriction 232. With valve 260 open, the tank discharges through the restriction at 250 more rapidly than the flow through 232; its pressure dropping toward the normal pressure in 36. Continued small flow through the tank in an amount determined by the relative sizes of 232 and 250, may then maintain enough pressure on 250 to keep pressure in 36 up to give a proper idle mixture, as in FIGS. 8 and 9. Diaphragm 264 may be large enough to open valve 260 under the very small manifold depression occurring at starting turn-over even if an air cleaner is not used on the carburetor air intake. If an air cleaner is used, the diaphragm can be quite small, and the connection of 204 may be at any point in the air and mixture passage, otherwise, it may be necessary to close the throttle momentarily to apply sufficient depression to diaphragm 264.

FIG. 12 shows another modified system similar in some respects to FIGS. 9 and 11, and also to FIG. 5 where additional reference pressure is momentarily applied to the delivery stage diaphragm. The parts similar to those of FIG. 11 are given the same numerals. The initial feed to the system via 60 is controlled here by the solenoid cut-off valve 64 as in FIG. 3; and the controls of that valve are the same as in FIGS. 2 and 3 and are given the same numerals. Here, as in FIG. 3, valve 64 is opened on initial engine turnover and held open throughout engine operation.

A spring valve 270 fixedly mounted at one end at 272 normally presses against and closes the end of balance tube 52 where it communicates with reference chamber 50. A small diaphragm 274 has a chamber 276 at its outer face connected by passages 278 with first stage chamber 24, or with intake 60, for communicating the higher pressure to 276. Diaphragm 274 is normally held out by a spring 280. When initial control valve 64 opens on initiation of engine turn-over, pressure from 24 in chamber 276 moves diaphragm 274 inwardly (to the right in the figure), thereby compressing the air in reference chamber 50 to a higher than normal pressure, thus holding valve 40a open until a higher than normal pressure has built up in 36, 36d. That higher pressure continues until diaphragm 274 has moved in to press its diaphragm plate 275 against spring valve 270, pressing it off balance tube 52. The increased pressure in 50 is then relieved and the pulse pressure there and in 36, 36d, falls to normal. The balance tube 52 may have a restriction 120, which may slow the fall of pressure in 50. And, with such a restriction, spring valve 270 may be omitted. In that case diaphragm 274 moves to the right, to raise the pressure in 50, at a rate controlled by 120. When the diaphragm reaches its limiting position to the right—as by it or its spring 280 coming up against 272—then the increased pulse pressure in 50 leaks off through 120. The time period of the pressure pulse is primarily controlled by the size of passage 278, or the size of bleed 120, determining the time period of movement of diaphragm 274 to its position at the right.

In this system, as in fact in any of the others here described, additional fuel for idling may be provided by the valvularly controlled system shown at 260, 262, 264, etc., which is open throughout engine operation as it is in FIGS. 12 and 19, but here uniformly raises the pressure in 36, not in a pulse.

FIG. 13 shows a variational form of FIG. 12, showing only the parts of that system necessary to show the variation. Other parts of the system may be the same as in FIG. 12. Here diaphragm 274 has a chamber 284, at its face opposite chamber 276, separated from reference chamber 50 by the wall 286. When air is compressed in 284 by movement of 274 to the right, an air stream flows out from 284 through the nozzle 288, in ejector relation to balance tube 52, into reference chamber 50. The pressure in 50 is thus raised as long as 274 is moving to the right. When it brings up against 286, the increased pressure in 50 bleeds off through 52.

FIG. 14 shows another variation of FIG. 12, again showing only the parts of that system that are here modified. Here, a spring 300 normally applies a reference pressure to diaphragm 38 so that, upon initial opening of initial cut-off valve 64, pressure immediately builds up in 36 to higher than normal. Diaphragm 274 moves in (to the right) at a rate controlled by restriction of 278 and, through pin 302 and lever 304 lifts spring 300 off diaphragm 38, after a predetermined timed pressure pulse in 36. When that occurs, pressure in 36 drops to normal.

FIG. 15 shows another modified form of system in which initiation of the timed pressure pulse is caused by the initial throttle opening that is commonly necessary for starting in some engine systems. The throttle may be, as it is in some installations, automatically opened by virtue of energization of the starting turn-over system, or it may be manually opened more or less simultaneously with that energization and the starting turn-over of the engine.

In this FIG. 15 the carburetor and the fundamental and normally operating features of the regulator are in substance the same as in FIG. 9 and are given the same numerals. As in other figures the regulator may here be of single stage and initial feed 60 may go directly to the delivery stage valve 40a and also to the pulse feed later described. The subdivision wall 36e forming a reference chamber 36d as a subdivision of delivery chamber 36 is not necessary here but that sub-chamber may be used for other controls of the delivery pressure.

Second stage valve 40a, here shown as opening against the pressure in 24, may be biased as desired. It is here shown as biased toward closed position by the pressure in 24 on it, and/or by spring mounting 40b. However, the system of this figure operates to provide the timed pressure pulse whether the normal delivery pressure is below, at, or above the effective pressure in air intake 10, as will become apparent.

A small tank, or capacity chamber, 234 is fed with gas under pressure from any suitable initial source, as from initial intake 60, or, as here preferable, indirectly from that source via 62 at the regulated pressure in 24. If intake 60 is controlled by a cut-off valve, tank 234 fills to that higher pressure immediately that valve opens; in any case, 234 normally carries a charge of gas at that higher pressure ready for the starting operations to be described.

A small diaphragm 500 has a diaphragm chamber 502 at one face. Its movement into that chamber (to the right in the figure), transmitted by valve pin 504, lifts a valve 506 off a seat controlling an orifice 508 which communicates tank 234 with reference chamber 50. Valve 506 is normally held closed by its spring 510. Diaphragm chamber 502 communicates with the engine manifold via tube 204 to apply manifold depression to 502 when the engine is in normal operation. If an air cleaner is applied to air intake 10, that depression may be so applied with 204 connected into the air and mixture passage of the carburetor at any point; if not, the connection is beyond throttle 14, as shown.

Throttle shaft 512 is shown as carrying a cam 514 that, as the throttle opens in the direction indicated, engages a foot 516 on a push rod 518 to move that rod to the right. Such movement, pushing against diaphragm 500, moves valve 506 off its seat, opening the passage 508. Thus, when throttle 14 is opened, either manually, or automatically, in conjunction with the starting turn-over of the engine, tank 234 begins to discharge its higher pressure charge through 508 into reference chamber 50, raising the pressure there and consequently, by opening valve 40a, raising the delivery pressure in 36 above normal. The rate at which 234 discharges and the increase in pressure in 50 and 36, are controlled primarily by the size of orifice 508 and the size of balance tube 52, or of restriction 120 in it. Both those passages are considerably larger than the restriction at 232 in the feed tube 62 leading to 234, so that the constant flow of gas into 234 is much smaller than the outflow through 508. When 508 is opened the pressure in 234 consequently falls off, accompanied by fall-off of pressure in 50 and 36 to, or substantially to normal. The time period of the pressure pulse is controlled primarily by the tank capacity and the sizes of 508 and 120.

As the pressure in delivery chamber 36, and at venturi 12, falls off, the engine starts when combustible starting mixture proportions are reached in the venturi. Immediately the engine goes into normal operation, the increased manifold depression applied via 204 to diaphragm chamber 502 is sufficient then to hold diaphragm 500 to the right and hold valve 506 open during normal engine operation. The small continuous flow through 232 and 508 to 50 may slightly raise the normal operating pressure in 50 and 36 to provide idling fuel. A light spring 520 preferably holds foot 516 away from throttle cam 514 when diaphragm 500 is held to the right throughout normal engine operation; valve spring 510 being strong enough to overcome 520 and move push rod 518 and its foot to the left to be engaged by cam 514 when diaphragm 500 is not moved to the right by normal engine operation.

Cam 514 and its engagement with rod foot 516 constitutes one form of lost motion connection between the throttle and the diaphragm-moving member 518, moving that member and the diaphragm in one direction only and allowing that diaphragm-moving member to remain in position out of throttle engagement when the diaphragm is held in or beyond the position to which the cam moves it.

The system of this form of FIG. 15 may also operate solely by virtue of engine manifold depression, as has been explained in connection with other figures. Diaphragm 500 may be made large enough to be moved to the right and unseat valve 506 by the small manifold depression occurring on engine turn-over for starting. Valve 506 then opens immediately on inception of starting turn-over, setting up the pressure pulse as above described, and remains open throughout engine operation, as before. On cessation of engine operation valve 506, whether initially opened in either of the manners here explained, is closed by its spring 510 and tank 234 then fills for a subsequent starting operation.

In general, the initial source of pressure fuel for the timed starting pulse may, in any of the forms here described, be derived from the initial pressure feed (line 60) instead of from the first stage of a two-stage regulator. The regulator can be of single stage, with the initial feed line going directly to the second stage valve, and with the pulse pressure derived from that initial feed. In effect, as has been stated, the lines 62 that take off the pressure for the pulse, are but branches of initial feed 60. And in FIG. 10, initial line 60, carrying fuel at any given pressure, can go directly to valve 401. This generalization may be visualized by merely assuming first stage chamber 24 in each case to have no pressure regulating valve 28, but to be merely a chamber feeding the second stage valve and the pulse passage.

In all the several system forms shown and explained here, a pulse of fuel feed to the engine at higher than normal feed pressure is initiated in conjunction with starting turn-over of the engine, the time duration of the pressure pulse being then for a predetermined period automatically set by a timing means. The pulse initiation is by virtue of some operation that normally accompanies starting turn-over, and, more specifically, it may be automatically by virtue of some function that automatically accompanies starting turn-over—such, for instance, as engine manifold depression or energization of the starting turn-over system. The pulse timing means may be, as has been illustratively described, a timing switch (FIGS. 1, 4, 5), a capacity (FIGS. 8, 9, 11, 15), or a timing valve such as shown in FIGS. 2, 3, 6, 7, or a timing valvular system such as shown incorporataed in the regulator in FIGS. 10, 12; or a timing system controlled by the restrained movement of some part, as in FIGS. 10, 12, 13, 15.

As has been mentioned before, one of the functions of the pressure pulse is to clear out air from the delivery passages of the regulator—from the delivery chamber and the delivery piping to the carburetor. In figures such as FIGS. 1, 2, 3, that clearing out is done by applying the pressure pulse directly to the delivery chamber; in FIG. 8a, indirectly to that chamber by the described ejector action. In figures such as FIGS. 4, 5, 8, 9, 10, 11 and 12 to 15, the pulse is directly applied as a reference pressure to the delivery controlling diaphragm, causing the delivery controlling valve to raise a pulse of pressure in the delivery chamber, to clear out the delivery passages; and in some of these, e.g. FIGS. 12–14, the pressure pulse is also directly applied to the delivery chamber. In every case, the pressure pulse not only momentarily increases the pressure of fuel feed to the carburetor, but also quickly clears out from the delivery passages any air that may have entered while the engine stands at rest and fuel is not being fed into those passages.

We claim:

1. In gaseous fuel feed systems for internal combustion engines which comprise a carburetor having an air-and-mixture passage connecting with the engine intake manifold, a fluid pressure regulator having a delivery connection delivering fuel to said passage normally at a predetermined normal delivery pressure, an initial fuel feed for the regulator at higher than said normal delivery pressure, an engine starting turn-over system, and energizing means for said starting system: the combination of means, initially actuated in conjunction with starting turn-over of the engine, to raise the pressure of said fuel delivery to a pressure higher than said normal delivery pressure, and automatic timing means adapted to act independently of the starting system to disable said pressure raising means at the end of a predetermined time period after its actuation.

2. The combination defined in claim 1, and in which the pressure raising means is actuated by virtue of starting turn-over of the engine.

3. The combination defined in claim 1, and in which the pressure raising means is actuated by virtue of initial energization of the starting system.

4. The combination defined in claim 1, and in which the pressure raising means is actuated by virtue of engine manifold depression during starting turn-over.

5. The combination defined in claim 1, and in which the pressure raising means includes normally closed valvular means fed with fuel under a pressure higher than said normal delivery pressure and opened in conjunction with starting turn-over of the engine, and wherein the timing means acts to close said valvular means.

6. The combination defined in claim 5 and wherein said valvular means is opened by virtue of starting turn-over of the engine.

7. The combination defined in claim 5 and including also a passage by-passing the valvular means to feed idling fuel to the air-and-mixture passage.

8. The combination defined in claim 1, in which the fluid pressure regulator includes a delivery chamber from which fuel is delivered to the air-and-mixture passage; and in which the pressure raising means delivers fuel at higher than normal pressure to said fuel delivery of the delivery chamber, thereby flushing out the delivery chamber and its delivery to the air-and-mixture passage.

9. The combination defined in claim 1, in which the regulator includes a pressure controlling diaphragm, and in which the pressure raising means includes means for applying a reference pressure to the regulator diaphragm.

10. The combination of claim 1, and embodying a normally closed valve fed with fuel under pressure higher than said normal delivery pressure, means acting in conjunction with starting turn-over of the engine to open said valve, an automatic and normally open timing valve to which the normally closed valve delivers fuel under said higher pressure, said timing valve acting, under said delivered pressure, to close at the end of a predetermined time period after inception of pressure delivery from said normally closed valve.

11. The combination defined in claim 10, and in which said normally closed valve controls initial feed of fuel under higher than normal pressure to the regulator.

12. The combination defined in claim 11 and in which the normally open valve is associated with the regulator.

13. In gaseous fuel feed systems for internal combustion engines, the combination with a carburetor having an air-and-mixing passage, and a starting turn-over system for the engine, of a fluid pressure regulator having a delivery connection delivering fuel to said passage normally at a predetermined normal delivery pressure, said regulator including a delivery chamber from which fuel is fed to said air-and-mixture passage, a normally open inlet valve for said delivery chamber, a normally closed valve controlling feed of fuel under a pressure higher than the normal delivery pressure to said inlet valve, means acting in conjunction with starting turn-over of the engine to open said normally closed valve, and means actuated by virtue of application of said higher than normal pressure to said inlet valve and by virtue of the existence of a higher than normal pressure in said delivery chamber tending to close said normally open inlet valve.

14. The combination defined in claim 1, and embodying an element having a predetermined fuel capacity and restrictedly fed from the initial fuel feed, and a normally closed valve controlling discharge from said capacity element and opened in conjunction with starting turn-over of the engine.

15. In feed systems for starting and operating internal combustion engines which comprise means for feeding air and for feeding fuel to the engine normally at a predetermined normal pressure, and means for turning the engine over for starting; the combination of means, actuated in conjunction with starting turnover of the engine, to raise the pressure of the fuel feed to a pressure higher than said normal feed pressure, and automatic timing means adapted to act independently of the turnover means to disable said pressure raising means at the end of a predetermined time period after its actuation.

16. In gaseous fuel feed systems for internal combustion engines having an air intake, said systems embodying a fluid pressure regulator normally delivering fuel to the engine at a predetermined normal pressure; the combination of means, actuated in conjunction with starting turn-over of the engine, to raise the pressure of said fuel delivery to a pressure higher than said normal delivery pressure, and automatic timing means acting to disable said pressure raising means at the end of a predetermined time period after its actuation.

No references cited.

UNITED STATES PATENT OFFICE
CERTIFICATE OF CORRECTION

Patent No. 2,988,078                            June 13, 1961

Roy K. Ensign et al.

It is hereby certified that error appears in the above numbered patent requiring correction and that the said Letters Patent should read as corrected below.

Column 16, line 44, for "air-and-mixing" read -- air-and-mixture --.

Signed and sealed this 31st day of October 1961.

(SEAL)
Attest:

ERNEST W. SWIDER
Attesting Officer

DAVID L. LADD
Commissioner of Patents

USCOMM-DC